United States Patent [19]
Velepec

[11] Patent Number: 5,433,563
[45] Date of Patent: Jul. 18, 1995

[54] CUTTING TOOL

[75] Inventor: Fredric A. Velepec, Glendale, N.Y.

[73] Assignee: Fred M. Velepec Co., Inc., Glendale, N.Y.

[21] Appl. No.: 296,203

[22] Filed: Aug. 25, 1994

[51] Int. Cl.[6] .......................... B23Q 3/12; B23C 5/26; B27C 5/00
[52] U.S. Cl. ........................ 409/234; 83/875; 144/218; 144/231; 409/213
[58] Field of Search ............... 409/234, 232, 205, 213, 409/217, 218, 226, 204, 209, 203; 144/134 D, 253 D, 231, 134 A, 218, 229, 145 A, 237; 83/875; 407/31

[56] References Cited

U.S. PATENT DOCUMENTS

| | | | |
|---|---|---|---|
| 947,079 | 1/1910 | Latcham | 144/253 D |
| 1,591,710 | 7/1926 | Joyner | 144/253 D X |
| 1,748,767 | 2/1930 | Heston et al. | 144/134 A |
| 2,635,657 | 4/1953 | Dietrich | 83/875 X |
| 3,901,295 | 8/1975 | Downing | 409/205 |
| 4,242,020 | 12/1980 | Schmid | 409/234 |
| 4,244,248 | 1/1981 | Adell et al. | 409/234 X |
| 4,505,086 | 3/1985 | Hansen | 144/218 X |
| 4,557,303 | 12/1985 | Gardner et al. | 409/213 X |
| 4,557,496 | 11/1985 | Johannesson | 409/209 |
| 4,632,162 | 12/1986 | Angeloni | 144/229 |

FOREIGN PATENT DOCUMENTS

| | | | |
|---|---|---|---|
| 2256807 | 8/1975 | France | 144/231 |
| 256411 | 10/1990 | Japan | 409/180 |
| 36840 | 2/1923 | Norway | 144/134 A |
| 40077 | 6/1907 | Switzerland | 144/231 |
| 733880 | 5/1980 | U.S.S.R. | 409/213 |

Primary Examiner—William Briggs
Attorney, Agent, or Firm—Kenyon & Kenyon

[57] ABSTRACT

A tool for preparing a substrate edge of a counter-top to accept a molded apron having at least two perpendicular appendages. The tool includes cutters for cutting a channel and/or a rabbet into the substrate edge. The spacing between the cutting edges of the cutters corresponds to a spacing between the perpendicular appendages of the molded apron.

21 Claims, 3 Drawing Sheets

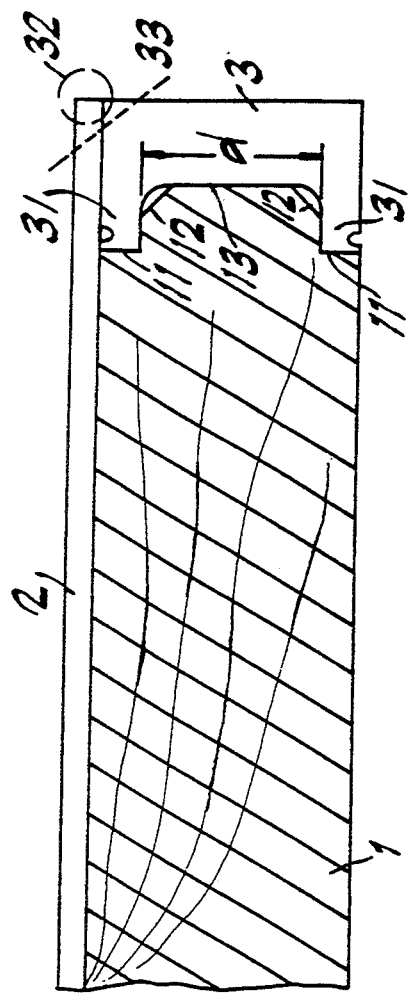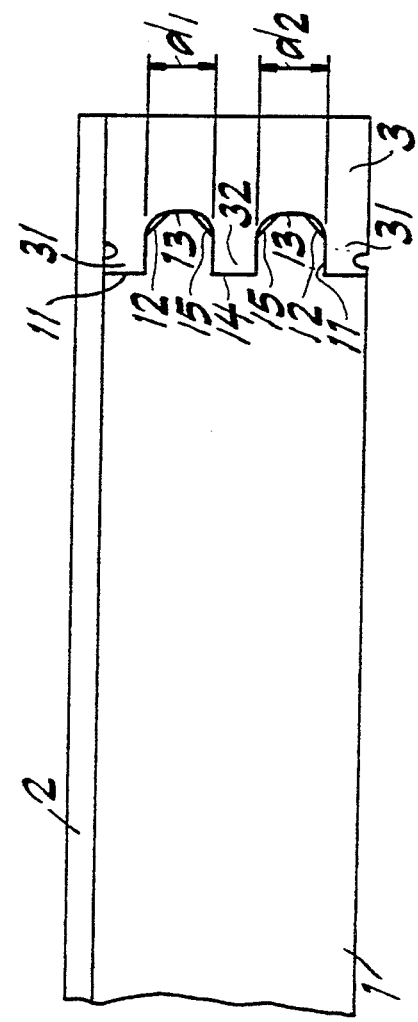

CUTTING TOOL

BACKGROUND OF THE INVENTION

The present invention is related to a high accuracy, safe, and adjustable tool, and in particular, to a tool for preparing a substrate edge of a counter-top to accept a molded apron.

Counter-tops are often fabricated from a substrate laminated with a laminated plastic (e.g., "FORMICA"). The substrate is typically wood, such as plywood, chipboard, or particle board. The laminated plastic (e.g., "FORMICA") is glued to the top and edge surfaces of the substrate and trimmed to achieve flush and uniform edges. Unfortunately, the finished (i.e., exposed) surface of laminated plastics (such as "FORMICA") is quite thin and as a consequence, scratches in the finished surface can not be repaired. A further drawback of a substrate laminated with a laminated plastic (such as "FORMICA") is that edges formed between the laminated plastic (e.g., "FORMICA") on the top surface of the substrate and the laminated plastic (e.g., "FORMICA") on a perpendicular edge surface of the substrate are visually "sharp" and can not be "softened" by routing a beveled edge or a rounded edge larger than the thickness of the laminated plastic (e.g., "FORMICA").

To overcome this drawback, thick solid synthetic products such as "CORIAN" and "SURELL," were introduced. These thick solid synthetic products can be cut, routed, and sanded using conventional power tools. The thick solid material itself provides the finished (i.e., exposed) surfaces. Therefore, scratches in the exposed surfaces of these products can be "sanded out" since these products are made from thick solid material and not a thin laminated finished surface. While these products have become popular, they are quite expensive. The expense of these materials is due, in large part, to their thickness.

To provide a less expensive alternative to the thick solid synthetic products mentioned above, semi-thick solid synthetic products were introduced. An example of a semi-thick solid synthetic product is "NUVEL" which is typically 3/32 of an inch thick. Like the thick solid synthetic products, with these semi-thick solid synthetic products, the material itself provides the finished (i.e., exposed) surface. Since scratches received by counter-tops are typically less than 3/32 of an inch deep, scratches can be "sanded out" of the semi-thick solid synthetic products in the same way that scratches are "sanded out" from the thick solid synthetic products. However, similar to the laminated plastics (such as "FORMICA"), the semi-thick solid synthetic products must be glued to a strong and rigid substrate surface, for example, wood such as plywood, chip board, or particle board. Consequently, an apron molding is needed to cover edge surfaces of the substrate and to simulate the look of the more expensive thick solid plastic products. The apron molding is typically fabricated from the same synthetic material as the thick solid synthetic products such as "CORIAN" or "SURELL." The apron molding should align with an end of a semi-thick solid synthetic product bonded to a top surface of the substrate. Further, the apron molding should be sufficiently thick so that edges formed by the semi-thick solid synthetic product and the apron molding may be softened by routing a beveled edge or a curved edge. Flat-backed apron moldings are inadequate for such applications because alignment with the end of the semi-thick solid synthetic product bonded to the top surface of the substrate is not assured. Further, a glue bond between the apron molding and an edge surface of the substrate, by itself, may provide an insufficient bond when the apron molding is subjected to the cutting operations necessary for beveling or rounding the edges discussed above.

In view of the above drawbacks of flat-backed apron moldings, apron moldings having two or more perpendicular appendages were created. By properly preparing the edge surface of the substrate, the perpendicular appendages of the apron molding can be held to the substrate edge with a friction fit in addition to an adhesive bond. Unfortunately, preparing the substrate for such an apron molding presents several difficulties.

First, the substrate must be cut to form two or more channels and/or rabbets to accept the two or more perpendicular appendages of the apron molding. The distance between the channels or rabbets must closely match the distance between the perpendicular appendages of the apron molding so that a tight friction fit is assured. This distance must be maintained even after the tool for preparing the substrate edge wears and is sharpened.

The tool for preparing the substrate edge for the apron molding should also be able to simultaneously trim the edge of the semi-thick solid synthetic material so that it is flush with the finished (i.e., exposed) surface of the apron molding.

If preparing the substrate edge involves providing rabbets, the tool for preparing the substrate should be able to provide a rabbet at the top of the substrate without damaging or cracking the semi-thick plastic material and should be able to provide a rabbet at the bottom of even thick substrates.

Providing bevels in the edge of the substrate at areas adjacent to the channels and/or rabbets is desirable because this permits the perpendicular appendages of the apron molding to be more easily positioned at, and forced into, the channels and/or rabbets.

Lastly, the tool used for preparing the substrate edge must safe, even when the tool operates at rotational velocities of up to 16,000 rpm.

SUMMARY OF THE INVENTION

The object of the present invention is to provide a tool for preparing a substrate edge for an apron molding having two or more perpendicular appendages. The tool should perform each of the above mentioned functions, and in particular, should be able to perform each of the above mentioned functions in a single operation step.

The present invention meets this objective by providing a tool for preparing an edge surface of a substrate for an apron molding having two perpendicular appendages separated by a distance d. The tool includes a shaft, a trim cutter, at least two molding cutters, a ball bearing assembly, at least one spacer and a nut. The shaft includes a shank section and a holding section. The holding section has a first end and a second, threaded, end. The trim cutter is arranged on the holding section of the shaft. The first molding cutter is arranged on the holding section of the shaft between the trim cutter and the second end of the holding section of the shaft. The ball bearing assembly and the spacer(s) have a total width of $d_s$ and are arranged on the holding section of the shaft between the first molding cutter and the second end of the holding section of the shaft. The second molding cutter is arranged on the holding section of the shaft between the ball bearing assembly and the spacer(s) and the second end of the holding section of the shaft. The nut is located on the second end of the holding section of the shaft. The nut holds and fixes the trim cutter, the first molding cutter, the ball bearing assembly, the spacer(s), and the second molding cutter on the shaft. A sum of the total width of the ball bearing assembly and the spacer(s) $d_s$, a distance between the inside edge of the first molding cutter and the inside edge of its cutting surface, and a distance between the inside edge of the second molding cutter and the inside edge of its cutting surface is substantially equal to the distance d between the two perpendicular appendages of the apron molding.

To ensure safe operating conditions, the diameter of the shank should be at least one fifth (1/5) of the diameter of the largest molding cutter.

The first molding cutter may be either a rabbet cutter or a channel cutter. Similarly, the second molding cutter may be either a rabbet cutter or a channel cutter.

In a preferred embodiment, the first molding cutter includes a further cutting surface to cut a bevel adjacent to the channel or rabbet and the second molding cutter also includes a further cutting surface to cut a bevel adjacent to the channel or rabbet. Alternatively, the first and second molding cutters may each include a further cutting surface to round out an edge adjacent to the channel or rabbet.

In a preferred embodiment, two spacers are arranged on opposite sides of the ball bearing assembly.

In each of the embodiments, the spacer(s) has a first total width and can be replaced with replacement spacer(s) having a second total width slightly less than the first total width.

In an alternative embodiment of the tool, the tool prepares the edge surface of the substrate with a channel and includes a channel cutter. The channel cutter is arranged on the holding section of the shaft between the first and second molding cutters.

BRIEF DESCRIPTION OF THE DRAWINGS

FIG. 1 is a cross-sectional side view which illustrates an assembled counter-top including a substrate prepared by the tool of the present invention, a semi-thick solid synthetic product, and an apron molding having two perpendicular appendages.

FIG. 2 is a cross-sectional side view which illustrates an assembled counter-top including a substrate prepared by the tool of the present invention, a semi-thick solid synthetic product, and an apron molding having more than two perpendicular appendages.

DETAILED DESCRIPTION

Figure 3:
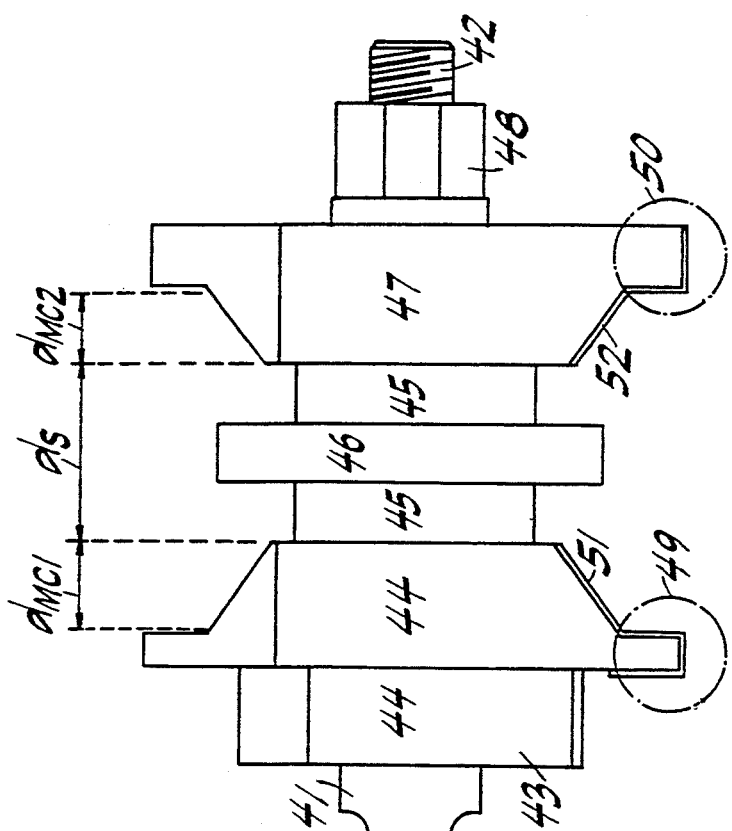
FIG. 3 is a cross-sectional side view of an embodiment of a tool of the present invention for preparing the substrate edge illustrated in FIG. 1.

FIG. 1 illustrates a cross-sectional side view of an assembled counter-top. The counter-top includes a substrate 1 including an edge which has been prepared by the tool of the present invention. The substrate 1 may be wood, such as plywood, chip-board, or particle board, for example. A semi-thick solid synthetic product 2 is bonded to the top surface of the substrate 1 with an adhesive. An apron molding 3 is held to an edge of the substrate 1 by a friction fit and adhesive. The apron molding 3 forms a flush surface with the semi-thick solid synthetic product 2 which has been bonded to the top surface of the substrate 1, as shown at 32. The edge formed by the semi-thick solid synthetic product 2 and the apron molding 3 may be trimmed to form a beveled edge as indicated by the dotted line 33. Alternatively, a rounded edge may be formed.

The edge of the substrate 1 includes a flat surface 13 having rabbets 11. Bevels 12 between the flat surface 13 of the substrate 1, and the rabbets 11 may be provided. Alternatively, rounded edges may be provided between the flat surface 13 of the substrate 1 and the rabbets 11.

As discussed above, an apron molding 3 is attached to the edge of the substrate 1. The apron molding 3 includes perpendicular appendages 31 which fit into the rabbets 11 of the substrate 1. The apron molding 3 is held to the substrate by adhesive and by a friction fit provided by the perpendicular appendages 31 and the rabbets 11. The distance between the rabbets 11 must closely match the distance "d" between the perpendicular appendages 31 to maintain a tight friction fit.

FIG. 2 is a cross-sectional side view of an assembled counter-top. FIG. 2 is similar to the counter-top of FIG. 1 except that the apron molding 3 is provided with a further perpendicular appendage 32. The substrate 1 includes an edge which is prepared, by the tool of the present invention, to have a channel 14 in addition to the rabbets 11. The edges between the flat surfaces 13 and the channel 14 may be provided with bevels 15. Alternatively, these edges may be rounded. The distance between the upper rabbet 11 and the channel 14 must closely match the distance $d_1$ between the upper perpendicular appendage 31 and the additional perpendicular appendage 32 of the molding apron 3 to ensure a tight friction fit between the molding apron 3 and the substrate 1. Similarly, the distance between the channel 14 and the lower rabbet 11 must closely match the distance $d_2$ between the additional perpendicular appendage 32 and the lower perpendicular appendage 31 of the molding apron 3 to ensure a tight friction fit between the molding apron 3 and the substrate 1.

FIG. 3 is a cross-sectional side view of an embodiment of a tool of the present invention for preparing the substrate edge illustrated in FIG. 1. The tool is an assembly of elements which include a shaft 40, a trim cutter 43, a first molding cutter 44, at least one spacer 45, a ball bearing assembly 46, a second molding cutter 47, a washer 70, and a nut 48.

Figure 5:
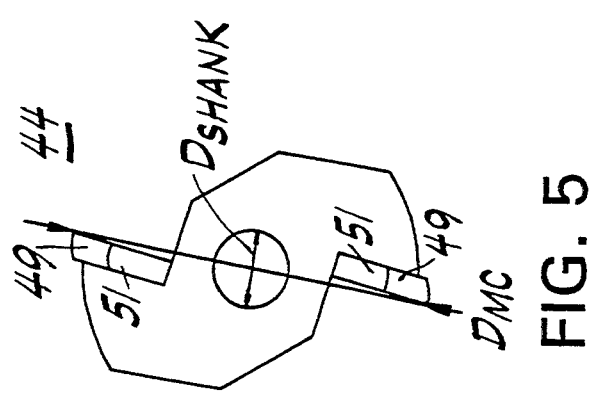
FIG. 5 is a bottom view of a molding cutter used in the assembled tool of the present invention.

A bottom view of the molding cutter 44 is illustrated in FIG. 5. The shank diameter $D_{SHANK}$ and the molding cutter diameter $D_{MC}$ are shown in FIG. 5. To ensure safe operation of the cutting tool, the shank diameter $D_{SHANK}$ is at least one fifth (1/5) of the molding cutter diameter $D_{MC}$.

The shaft 40 includes a shank portion to be held by a machine tool such as a router, a flange 41, and a holding section which has a first end adjacent to the flange 41 and a threaded section 42 at a second end. Elements can be arranged on the holding section of the shaft 40. The arrangement of elements are held together on the holding section of the shaft 40 by the flange 41 on the first end, and a tightened nut 48 on the second, threaded, end. The nut 48 can be loosened and removed from the threaded section 42 of the shaft 40 so that elements can be removed from the holding section of the shaft 40, added to the holding section of the shaft 40, or rearranged on the holding section of the shaft 40.

To prepare the substrate edge illustrated in FIG. 1, the holding section of the shaft 40 is provided, from the flange 41 to the nut 48, with a trim cutter 43, a first molding cutter 44, an assembly including at least one spacer 45 and a ball bearing assembly 46, a second molding cutter 47 and a washer 70.

Referring to FIGS. 1 and 3, in operation the trim cutter 43 trims the semi-thick solid synthetic material 2 which has been bonded to the top surface of the substrate 1. The first molding cutter 44 includes a cutting section 49 for rabbeting the top of the edge of the substrate (See FIG. 1, element 11.) and a further cutting section 51 for beveling the edge between the flat portion of the substrate edge 13 and the rabbet 11 (See FIG. 1, element 12.). As mentioned above, a rounded edge may be alternatively provided between the flat portion of the substrate edge 13 and the rabbet 11. In such an alternative, the further cutting section 51 would have a convex curve.

The second molding cutter 47 is similar to the first molding cutter and performs a similar function. That is, the second molding cutter 47 includes a cutting section 50 for rabbeting the bottom edge of the substrate (See FIG. 1, element 11.) and a further cutting section 52 for beveling the edge between the flat portion of the substrate edge 13 and the rabbet 11 (See FIG. 1, element 12.). Similar to the further cutting section 51 of the first molding cutter 44, in an alternative embodiment, the further cutting section 52 of the second molding cutter 47 can have a convex curve to provide a rounded edge rather than the beveled edge 12.

The first molding cutter 44 and the second molding cutter 47 are separated by an assembly including at least one spacer 45 and a ball bearing assembly 46. The ball bearing assembly 46 permits the tool to travel smoothly along the flat surface 13 of the edge of the substrate 1. The difference between the diameter of the bearing assembly 46 and the diameters of the first molding cutter 44 and the second molding cutter 47 determines the depth of the cuts made by the molding cutters. The total width of the ball bearing assembly 46 and the at least one spacer 45 is shown as distance $d_s$. The distance from an inside surface of the first molding cutter 44 to the inside edge of its cutting section 49 is shown as distance $d_{MC1}$. The distance from an inside surface of the second molding cutter 47 to the inside edge of its cutting section 50 is shown as the distance $d_{MC2}$. To ensure a tight friction fit between the apron molding 3 and the substrate 1 (See FIG. 1.), these distances should have the following relationship.

$$d = d_s + d_{MC1} + d_{MC2} \tag{1}$$

In practice, d may be slightly less than the sum $d_s + d_{MC1} + d_{MC2}$

In a preferred embodiment of the present invention, the width of the cutting section 49 of the first molding cutter 44 is less than the width of the cutting section 50 of the second molding cutter 47. This assures that a thick substrate 1 is completely rabbeted at the its bottom surface while the top surface of the substrate 1 is rabbeted without chipping the semi-thick synthetic material 2 glued to the top of the substrate 1.

As the cutting sections 49–52 of the first and second molding cutters dull, they must be sharpened. The distance $d_{MC1}$ between the inside edge of the first molding cutter 44 and the inside edge of its cutting section 49 and the distance $d_{MC2}$ between the inside edge of the second molding cutter 47 and the inside edge of its cutting section 50 each slightly increase as a consequence of such a sharpening of the cutting surfaces. To maintain the relationship of equation (1) above, the distance $d_s$ corresponding to the total width of the ball bearing assembly 46 and the at least one spacer 45 must be decreased in an amount corresponding to the total increase in the distances $d_{MC1}$ and $d_{MC2}$ due to sharpening. The decrease in the distance $d_s$ is preferably achieved by replacing the at least one spacer 45 with a smaller spacer or spacers 45'. Thus, with the present invention, a tight friction fit can be maintained between the apron molding 3 and the substrate 1 even after the first and second molding cutters 44 and 47 have been sharpened.

Figure 4:
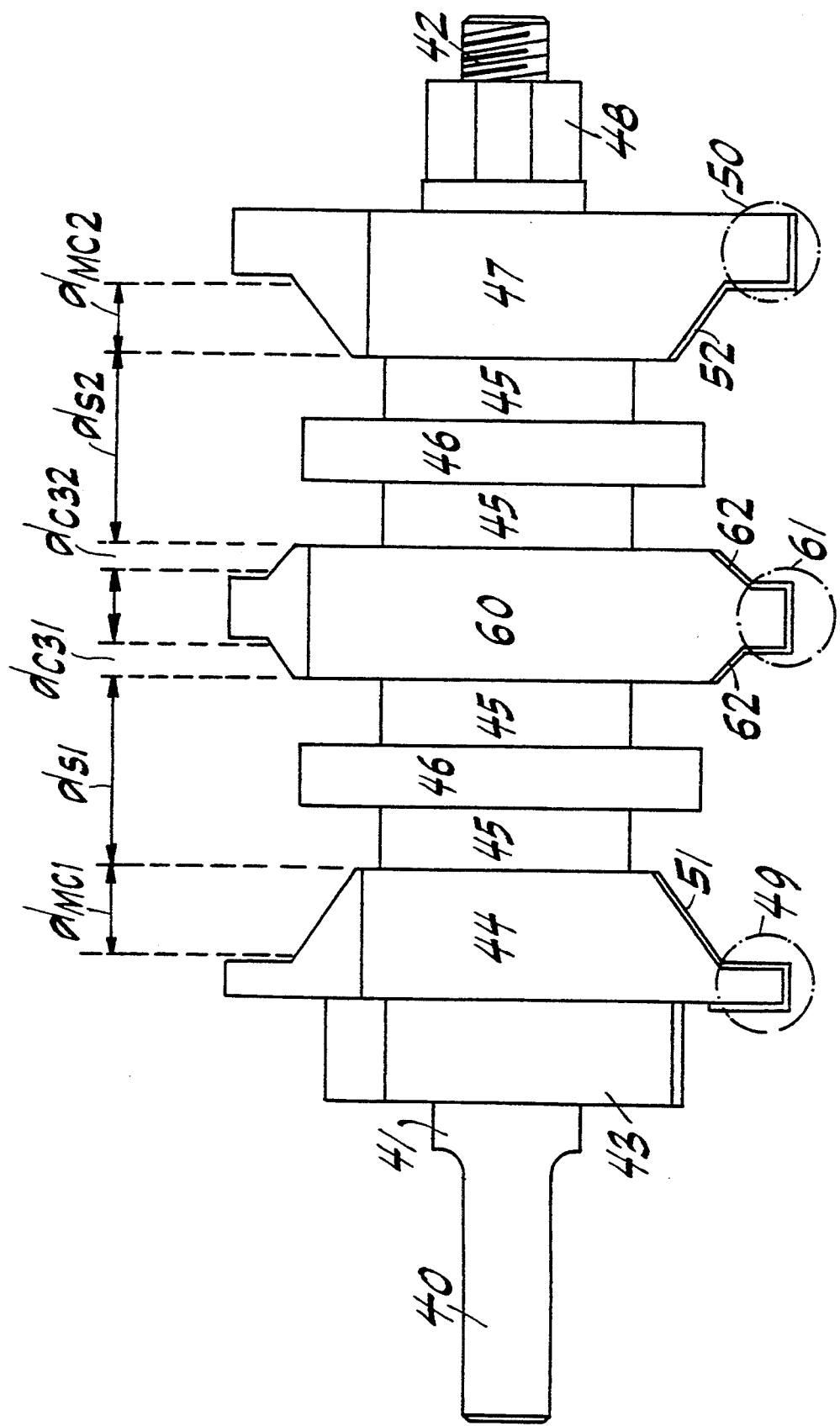
FIG. 4 is a cross-sectional side view of an embodiment of a tool of the present invention for preparing the substrate edge illustrated in FIG. 2.

FIG. 4 is a cross-sectional side view of an embodiment of a tool of the present invention for preparing the substrate edge illustrated in FIG. 2. The tool is an assembly of elements which include a shaft 40, a trim cutter 43, a first molding cutter 44, at least two spacers 45, at least one ball bearing assembly 46, a third cutter 60, a second molding cutter 47, a washer 70 and a nut 48. Like numbered elements perform the same functions as the elements described with respect to FIG. 3. The third cutter 60 includes a cutting surface 61 for providing the substrate edge with a channel (See FIG. 2, element 14) and further cutting surfaces 62 for providing bevels 15 between the flat surfaces 13 of the edge of the substrate and the channel 14. Similar to the further cutting surfaces 51 and 52 of the first and second molding cutters 44 and 47, respectively, described above, the further cutting surfaces 62 of the third cutter 60 may be convex to provide rounded edges rather than the beveled edges 15.

The total width of the ball bearing assembly 46 and the at least one spacer 45 between the first molding cutter 44 and the third cutter 60 is shown as the distance $d_{S1}$. The distance between an inside surface of the first molding cutter 44 and the inside edge of its cutting section 49 is shown as distance $d_{MC1}$. The distance between the left most surface of the third cutter 60 and the left most surface of its cutting section 61 is shown as distance $d_{C31}$. To ensure a tight friction fit between the apron molding 3 and the substrate 1 (See FIG. 2.), these distances should have the following relationship.

$$d_1 = d_{S1} + d_{MC1} + d_{C31} \tag{2}$$

In practice, $d_1$ may be slightly less than the sum $d_{S1} + d_{MC1} + d_{C31}$ Similarly, the total width of the ball bearing assembly 46 and the at least one spacer 45 between the third cutter 60 and the second molding cutter 47 is shown as the distance $d_{S2}$. The distance between an inside surface of the second molding cutter 47 and the inside edge of its cutting section 50 is shown as distance $d_{MC2}$. The distance between the right most surface of the third cutter 60 and the right most surface of its cutting section 61 is shown as distance $d_{C32}$. To ensure a tight friction fit between the apron molding 3 and the substrate 1 (See FIG. 2.), these distances should have the following relationship.

$$d_2 + d_{S2} + d_{MC2} + d_{C32} \tag{3}$$

In practice, $d_2$ may be slightly less than the sum $d_{S2}+d_{MC2}+d_{C32}$.

The at least two spacers 45 may be replaced with spacers 45' having a slightly smaller width, in a manner similar to that described above with reference to FIG. 3, when the cutting surfaces 49 and 50 of the first and second molding cutters 44 and 47, respectively, and the cutting surface 61 of the third cutter 60 are sharpened.

What is claimed is:

1. A tool for preparing an edge surface of a substrate for an apron molding having at least two perpendicular appendages separated by a predetermined distance, the tool comprising:
   a) a shaft including a shank section and a holding section, said holding section having a first end and a second, threaded, end;
   b) a trim cutter disposed on said holding section of said shaft and adjacent to said shank section of said shaft;
   c) a first molding cutter having an inside edge and having a cutting surface with an inside edge, said first molding cutter being arranged on said holding section of said shaft between said trim cutter and said second end of said holding section of said shaft;
   d) an assembly, said assembly including
      i) a ball bearing assembly for engaging an edge surface of the substrate and for limiting a depth of a cutting, and
      ii) at least one spacer,
      wherein said assembly has a total width, and wherein said assembly is disposed on said holding section of said shaft between said first molding cutter and said second end of said holding section of said shaft;
   e) a second molding cutter having an inside edge and having a cutting surface with an inside edge, said second molding cutter being arranged on said holding section of said shaft between said assembly and said second end of said holding section of said shaft; and
   f) a nut, said nut located on said second end of holding section of said shaft and holding and fixing said trim cutter, said first molding cutter, said assembly, and said second molding cutter on said shaft,
   wherein a sum of the total width of the assembly, a distance between said inside edge of said first molding cutter and said inside edge of its cutting surface, and a distance between said inside edge of said second molding cutter and said inside edge of its cutting surface is substantially equal to the predetermined distance between the two perpendicular appendages of the apron molding.

2. The tool of claim 1 wherein said first molding cutter includes a further cutting surface to cut a bevel, and wherein said second molding cutter includes a further cutting surface to cut a bevel.

3. The tool of claim 1 wherein said first molding cutter includes a further cutting surface to round out an edge, and wherein said second molding cutter includes a further cutting surface to round out an edge.

4. The tool of claim 1 wherein said at least one spacer includes two spacers.

5. The tool of claim 4 wherein said two spacers are arranged on opposite sides of said ball bearing assembly.

6. The tool of claim 1 wherein said at least one spacer has a first total width and can be replaced with at least one replacement spacer having a second total width slightly less than said first total width.

7. The tool of claim 1 wherein said first molding cutter is a rabbet cutter and said second molding cutter is a rabbet cutter.

8. The tool of claim 1 wherein said first molding cutter is a rabbet cutter and said second molding cutter is a channel cutter.

9. The tool of claim 1 wherein said first molding cutter is a channel cutter and said second molding cutter is a rabbet cutter.

10. The tool of claim 1 wherein the first molding cutter is a channel cutter and said second molding cutter is a channel cutter.

11. The tool of claim 1 wherein said shank has a diameter which is at least one fifth of the greater of the diameter of the first molding cutter and the diameter of the second molding cutter.

12. A tool for preparing an edge surface of a substrate for an apron molding having a first, a second, and a third perpendicular appendage, the first and second appendages separated by a first predetermined distance and the second and third appendages separated by a second predetermined distance, the tool comprising:
   a) a shaft including a shank section and a holding section, said holding section having a first end and a second, threaded, end;
   b) a trim cutter disposed on said holding section of said shaft and adjacent to said shank section of said shaft;
   c) a first molding cutter having an inside edge and having a cutting surface with an inside edge, said first molding cutter being arranged on said holding section of said shaft between said trim cutter and said second end of said holding section of said shaft;
   d) a first assembly, said first assembly including
      i) a ball bearing assembly for engaging an edge surface of the substrate and for limiting a depth of a cut, and
      ii) at least one spacer,
      wherein said first assembly has a total width, and wherein said first assembly is arranged on said holding section of said shaft between said first molding cutter and said second end of said holding section of said shaft;
   e) a channel cutter, said channel cutter having a right edge and a left edge and having a cutting surface having a right edge and a left edge, said channel cutter being arranged on said holding section of said shaft between said first assembly and said second end of said holding section of said shaft;
   f) a second assembly, said second assembly including
      i) a ball bearing assembly, and
      ii) at least one spacer,
      wherein said second assembly has a total width, and wherein said second assembly is arranged on said holding section of said shaft between said channel cutter and said second end of said holding section of said shaft;
   g) a second molding cutter having an inside edge and having a cutting surface with an inside edge, said second molding cutter being arranged on said holding section of said shaft between said second assembly and said second end of said holding section of said shaft; and
   h) a nut, said nut located on said second end of holding section of said shaft and holding and fixing said trim cutter, said first molding cutter, said first assembly, said channel cutter, said second assembly, and said second molding cutter on said shaft, wherein a sum of the total width of the first assembly, a distance between said inside edge of said first molding cutter and said inside edge of its cutting surface, and a distance between said left edge of said channel cutter and said left edge of its cutting surface is substantially equal to the first predetermined distance between the first and second perpendicular appendages of the apron molding, and wherein a sum of the total width of the second assembly, a distance between said inside edge of said second molding cutter and said inside edge of its cutting surface, and a distance between said right edge of said channel cutter and said right edge of its cutting surface is substantially equal to the second predetermined distance between the second and third perpendicular appendages of the apron molding.

13. The tool of claim 12 wherein said first molding cutter includes a further cutting surface to cut a bevel, wherein said second molding cutter includes a further cutting surface to cut a bevel, and wherein said channel cutter includes two further cutting surfaces to cut bevels.

14. The tool of claim 12 wherein said first molding cutter includes a further cutting surface to round out an edge, wherein said second molding cutter includes a further cutting surface to round out an edge, and wherein said channel cutter includes two further cutting surfaces to round out edges.

15. The tool of claim 12 wherein said at least one spacer of said first assembly includes two spacers.

16. The tool of claim 12 wherein said at least one spacer of said second assembly includes two spacers.

17. The tool of claim 15 wherein said two spacers are arranged on opposite sides of said ball bearing assembly of said first assembly.

18. The tool of claim 16 wherein said two spacers are arranged on opposite sides of said ball bearing assembly of said second assembly.

19. The tool of claim 12 wherein said at least one spacer of said first assembly has a first total width and can be replaced with at least one replacement spacer having a second total width slightly less than said first total width.

20. The tool of claim 12 wherein said at least one spacer of said second assembly has a first total width and can be replaced with at least one replacement spacer having a second total width slightly less than said first total width.

21. A kit which can be assembled as a tool for preparing an edge surface of a substrate for an apron molding having at least two perpendicular appendages, the kit comprising:

a) a shaft including a shank section and a holding section, said holding section having a first end and a second, threaded, end;

b) a trim cutter which can be arranged on said holding section of said shaft;

c) a first molding cutter having a cutting surface having a first width, said first molding cutter can be arranged on said holding section of said shaft;

d) a ball bearing assembly which can be arranged on said holding section of said shaft;

e) at least one spacer which can be arranged on said holding section of said shaft and having a first total width;

f) a second molding cutter having a cutting surface having a second total width, said second molding cutter can be arranged on said holding section of said shaft;

g) a nut which can be secured to said second end of holding section of said shaft, said nut for holding and fixing other elements of the kit on said shaft; and h) at least one replacement spacer which can be arranged on said holding section of said shaft and having a second total width which is slightly less than said first total width in an amount corresponding to a change in said first width of said cutting surface of said first molding cutter and in said second width of said cutting surface of said second molding cutter if said first and second molding cutters are sharpened.

* * * * *

UNITED STATES PATENT AND TRADEMARK OFFICE
CERTIFICATE OF CORRECTION

PATENT NO. : 5,433,563
DATED : Jul. 18, 1995
INVENTOR(S) : Velepec

It is certified that error appears in the above-identified patent and that said Letters Patent is hereby corrected as shown below:

Column 6, Line 67, delete "$d_2 + d_{S2} + d_{MC2} + d_{C32}$" and insert -- $d_2 = d_{S2} + d_{MC2} + d_{C32}$ --.

Signed and Sealed this

Nineteenth Day of December, 1995

Attest:

BRUCE LEHMAN

Attesting Officer

Commissioner of Patents and Trademarks